United States Patent
Kouwa

(10) Patent No.: US 6,850,042 B2
(45) Date of Patent: Feb. 1, 2005

(54) CONTROL UNIT OF A VEHICLE GENERATOR

(75) Inventor: Tatsuki Kouwa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 80 days.

(21) Appl. No.: 10/022,888

(22) Filed: Dec. 20, 2001

(65) Prior Publication Data

US 2002/0185992 A1 Dec. 12, 2002

(30) Foreign Application Priority Data

Jun. 11, 2001 (JP) ........................................ 2001-175621

(51) Int. Cl.[7] .......................... H02H 7/06; H02P 11/00; H02P 9/00
(52) U.S. Cl. ............................. 322/24; 322/26; 322/28
(58) Field of Search ............................. 322/22, 24, 26, 322/28

(56) References Cited

U.S. PATENT DOCUMENTS

| | | | |
|---|---|---|---|
| 4,258,307 A | * 3/1981 | Mori et al. | 322/28 |
| 4,349,854 A | * 9/1982 | Mori et al. | 361/21 |
| 4,362,983 A | * 12/1982 | Mori et al. | 322/28 |
| 4,513,239 A | 4/1985 | Morishita et al. | |
| 4,618,811 A | * 10/1986 | Mashino et al. | 322/28 |
| 4,682,097 A | 7/1987 | Matsui | |
| 4,755,737 A | * 7/1988 | Komurasaki et al. | 322/99 |
| 5,243,270 A | * 9/1993 | Mayumi et al. | 322/28 |
| 5,491,400 A | * 2/1996 | Iwatani et al. | 322/28 |
| 5,581,172 A | * 12/1996 | Iwatani et al. | 322/28 |
| 5,672,954 A | * 9/1997 | Watanabe | 322/28 |
| 5,686,819 A | * 11/1997 | Iwatani et al. | 322/25 |
| 5,886,500 A | * 3/1999 | Iwatani et al. | 320/104 |
| 5,982,154 A | * 11/1999 | Kanazawa et al. | 322/29 |
| 6,014,016 A | * 1/2000 | Maruyama et al. | 322/28 |

FOREIGN PATENT DOCUMENTS

| | | |
|---|---|---|
| JP | 59-34500 | 3/1984 |
| JP | 05-083999 | 4/1993 |
| JP | 06-261465 A | 9/1994 |
| JP | 06-269136 | 9/1994 |
| JP | 08-238000 | 9/1996 |
| JP | 10-174310 | 6/1998 |
| JP | 7-39200 | 2/2000 |

* cited by examiner

*Primary Examiner*—Nicholas Ponomarenko
*Assistant Examiner*—Julio Gonzalez Ramirez
(74) *Attorney, Agent, or Firm*—Sughrue Mion, PLLC

(57) ABSTRACT

A control unit of a vehicle generator is provided which is capable of instantaneously stopping power generation in a safe manner with an inexpensive system configuration without the need of interrupting a large current when a key switch is turned off. The control unit includes a vehicle generator (2), a battery (5) adapted to be charged by an output of the vehicle generator, and a control circuit (2) having an on-off control switching transistor (1j) for controlling the turning on and off of a field current of the vehicle generator. The control circuit is operable to interrupt the on-off control switching transistor (1j) when a detected voltage of the battery (5) is higher than a reference voltage, and make the on-off control switching transistor (1j) conductive thereby to control the voltage of power generation at a predetermined voltage when the detected voltage of the battery (5) is below the reference voltage. A power generation stop circuit (6) is provided which has an off detection circuit (6a) for detecting turning off of a key switch (4) of a vehicle. The power generation stop circuit (6) is operable to stop the power generation of the vehicle generator (2) when the off detection circuit (6a) detects the turning off of the vehicle key switch (4). A power generation stop terminal (K) is connected with a control terminal of the on-off control switching transistor (1j). The power generation stop circuit (6) controls the power generation stop terminal (K) to stop the power generation of the vehicle generator (2) instantaneously when the off detection circuit (6a) detects the turning off of the vehicle key switch (4).

6 Claims, 5 Drawing Sheets

CONTROL UNIT OF A VEHICLE GENERATOR

This application is based on Application No. 2001-175621, filed in Japan on Jun. 11, 2001, the contents of which are hereby incorporated by reference.

BACKGROUND OF THE INVENTION

1. Field of the Invention

The present invention relates to a control unit of a vehicle generator, and more particularly to such a control unit of a vehicle generator capable of instantaneously stopping power generation of the vehicle generator in a safe manner when a key switch 4 of a vehicle is turned off.

2. Description of the Related Art

FIG. 5 is a circuit diagram illustrating the configuration of a known control unit of a vehicle generator which is capable of instantaneously stopping power generation of the vehicle generator upon turning off of a key switch 4 of a vehicle.

In FIG. 5, the known control unit includes a control circuit 1 for controlling the generation voltage of a vehicle generator 2, which is driven by an engine (not shown), at a predetermined voltage, a charge lamp 3, a key switch 4 of a vehicle, a battery 5, and a power generation stop circuit 6 for stopping the power generation of the vehicle generator 2 when the key switch 4 is turned off.

Here, the vehicle generator 2 has a field coil 2a, a three-phase stator coil 2b, a three-phase full wave rectifier 2c for rectifying the generation voltage of the three-phase stator coil 2b, and an auxiliary rectifier 2d for supplying a field current. A direct current full-wave rectified by the three-phase full wave rectifier 2c is supplied to the battery 5.

In addition, the control circuit 1 includes a combination of a diode 1a and voltage dividing resistors 1b, 1c connected between a voltage sensing terminal S and ground for detecting the voltage of the battery 5, a Zener diode 1d having a cathode connected with a connection point or node between the voltage dividing resistors 1b and 1c, a combination of a resistor 1e and a diode 1f provided between the resistor 1b and an output terminal L, a combination of a resistor 1g and an emitter-grounded npn transistor 1h provided between the output terminal L and ground, a flywheel diode 1i similarly provided between the output terminal L and ground, and a transistor 1j with a Darlington connection for turning on and off the field current. The Zener diode 1d as an anode connected with a control terminal of the transistor 1h. The control terminal of the transistor 1j is in turn connected with a connection point or node between the resistor 1g and the collector of the transistor 1h.

The power generation stop circuit 6 includes an off detection circuit 6a for detecting the turning off of the key switch 4, a transistor 6b which is made conductive based on an off detection signal of the off detection circuit 6a, a power generation stop relay 6c which is energized to close its contacts thereby to ground the output terminal L when the transistor 6b is made conductive, and a diode 6d provided between the key switch 4 and the output terminal L.

The known control unit of a vehicle generator as constructed above operates as follows.

The control circuit 1 detects the voltage of the battery 5 through the voltage sensing terminal S, and when the voltage of the battery 5 rises above a predetermined value which has been set in advance, that is, when the voltage imposed on the cathode of the Zener diode 1d rises above a Zener voltage, the transistor 1h is made conductive and the transistor 1j is made nonconductive so that a field current supplied to the field coil 2a is decreased, thus reducing the generation voltage of the generator 2. On the contrary, when the voltage of the battery 5 lowers, the transistor 1h is made nonconductive and the transistor 1j is made conductive whereby the field current is increased, thus raising the generation voltage of the generator 2.

When the key switch 4 is turned off in order to stop the engine of the vehicle which is now in operation, the off detection circuit 6a for the key switch 4 detects the turning off of the key switch 4 and makes the transistor 6b into a conductive state, whereby the contacts of the power generation stop relay 6c is turned on, thus grounding the output terminal L of the auxiliary rectifier 204 which supplies a field current to the field coil 2a.

As a result, current does not flow to the field coil 2a and hence power generation is stopped instantaneously. Thus, it becomes possible to stop power generation regardless of the operating conditions of the engine of the vehicle (even if the engine is coasting or rotating under the inertia effect).

In the known control unit of a vehicle generator as constructed above, in order to stop generation of electric power instantaneously, when the key switch 4 is turned off, the relay 6c is energized to ground the output terminal L of the auxiliary rectifier 2d thereby to interrupt the field current. For this reason, at the instant when the output terminal L of the auxiliary rectifier 2d is grounded, a large current in excess of 100 amperes might flow to the auxiliary rectifier (excitation diode) 2d, depending upon the power generation state of the generator 2 (the state of an electric load of the vehicle). Thus, there arises a problem that the auxiliary rectifier (excitation diode) 2d is required to have a large capacity.

Moreover, since a large current might flow through the relay 6c, too, the relay 6c is also required to have a large current-carrying capacity. In addition, there is another problem that a large current flowing through the relay 6c generates sparks at its contacts, which is dangerous.

In case of using a mechanical relay, there arise further problems such as wear of contacts, increased contact drop, etc., thus shortening the lifetime of the vehicle system.

SUMMARY OF THE INVENTION

The present invention is intended to obviate the problems as referred to above, and has for its object to provide a control unit of a vehicle generator which is simple in configuration and capable of instantaneously stopping power generation in a safe manner without the need of interrupting a large current upon turning off of a key switch of a vehicle.

Bearing the above object in mind, according to one aspect of the present invention, there is provided a control unit of the vehicle generator comprising: a vehicle generator; a battery adapted to be charged by an output of the vehicle generator; a control circuit having an on-off control switching section for controlling the turning on and off of a field current of the vehicle generator, the control circuit being operable to interrupt the on-off control switching section when a detected voltage of the battery is higher than a reference voltage, and make the on-off control switching section conductive thereby to control the voltage of power generation at a predetermined voltage when the detected voltage of the battery is below the reference voltage; a power generation stop circuit having an off detection circuit for detecting turning off of a key switch of a vehicle, the power generation stop circuit being operable to stop the power generation of the vehicle generator when the off detection circuit detects the turning off of the vehicle key switch; and a power generation stop terminal for interrupting the on-off control switching section; wherein the power generation stop circuit controls the power generation stop terminal to stop the power generation of the vehicle generator instantaneously when the off detection circuit detects the turning off of the vehicle key switch.

In a preferred form of the first aspect of the present invention, the power generation stop circuit comprises a grounding switching section which is operated based on an off detection signal from the off detection circuit to ground the power generation stop terminal.

According to a second aspect of the present invention, there is provided a control unit of a vehicle generator comprising: a vehicle generator; a battery adapted to be charged by an output of the vehicle generator; a control circuit having an on-off control switching section for controlling the turning on and off of a field current of the vehicle generator, the control circuit being operable to interrupt the on-off control switching section when a detected voltage of the battery is higher than a reference voltage, and make the on-off control switching section conductive thereby to control the voltage of power generation at a predetermined voltage when the detected voltage of the battery is below the reference voltage; and a power generation stop circuit having an off detection circuit for detecting the turning off of a key switch of a vehicle, the power generation stop circuit being operable to stop the power generation of the vehicle generator when the off detection circuit detects the turning off of the vehicle key switch; wherein the control circuit has a connection state detecting portion for stopping power generation when it becomes impossible to detect the voltage of the battery; and wherein the power generation stop circuit controls a voltage sensing terminal, which detects the voltage of the battery, to stop power generation when the off detection circuits the turning off of the vehicle key switch.

In a preferred form of the second aspect of the present invention, the power generation stop circuit interrupts the voltage sensing terminal from the battery to disable the detection of the voltage of the battery thereby to instantaneously stop power generation by means of a switching section which is operated based on an off detection signal of the off detection circuit indicative of the turning off of the vehicle key switch.

In another preferred form of the second aspect of the present invention, the power generation stop circuit acts to ground the voltage sensing terminal to disable the detection of the voltage of the battery thereby to instantaneously stop power generation by means of a switching section which is operated based on an off detection signal of the off detection circuit indicative of the turning off of the vehicle key switch.

In a further preferred form of the second aspect of the present invention, the power generation stop circuit comprises a grounding circuit for grounding an output terminal, which supplies a field current to the field coil, after the lapse of a predetermined period of time from the instant when a voltage sensing terminal, which detects the voltage of the battery, is controlled to stop power generation.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1.

Figure 1:
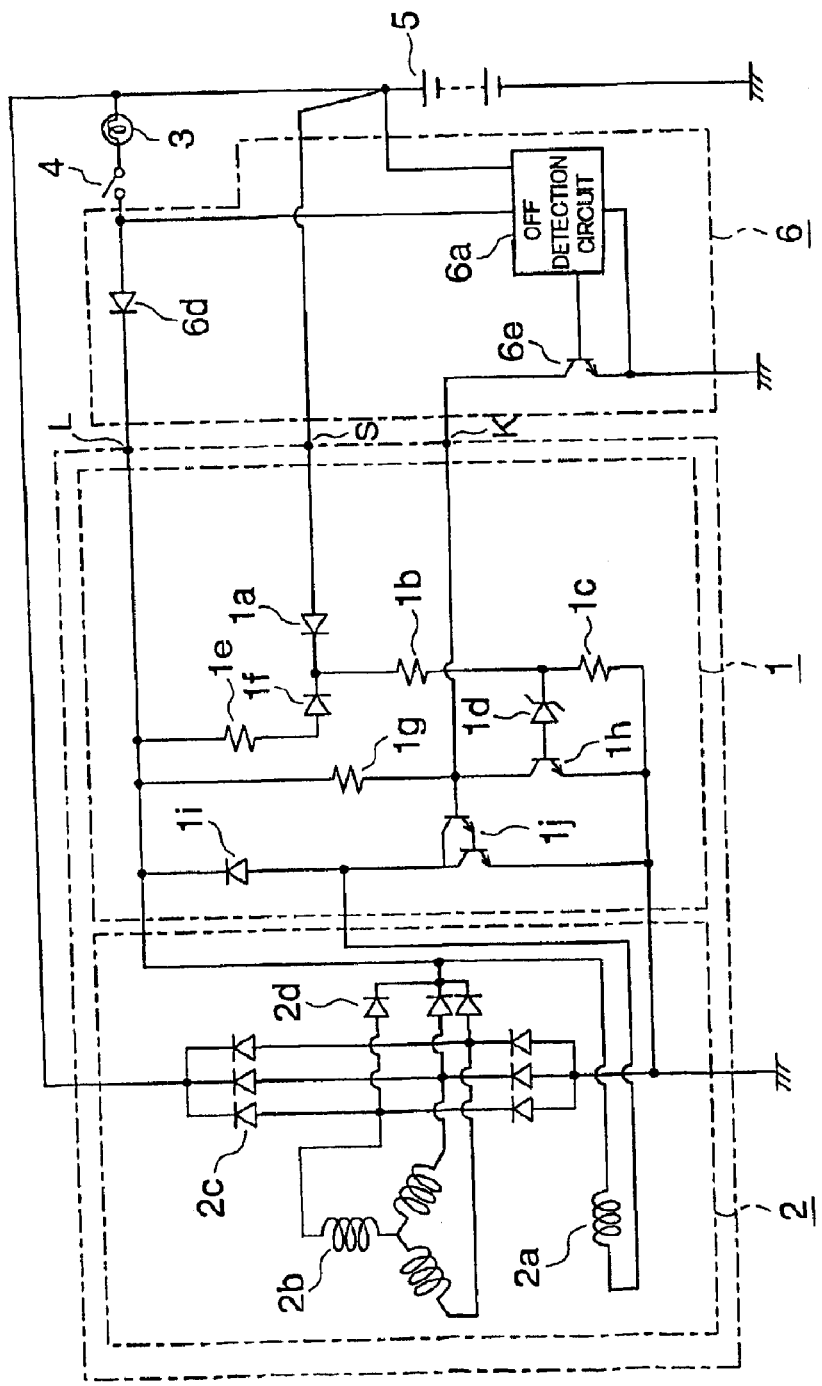
FIG. 1 is a circuit diagram illustrating the configuration of a control unit of a vehicle generator according to a first embodiment of the present invention.
Figure 5:
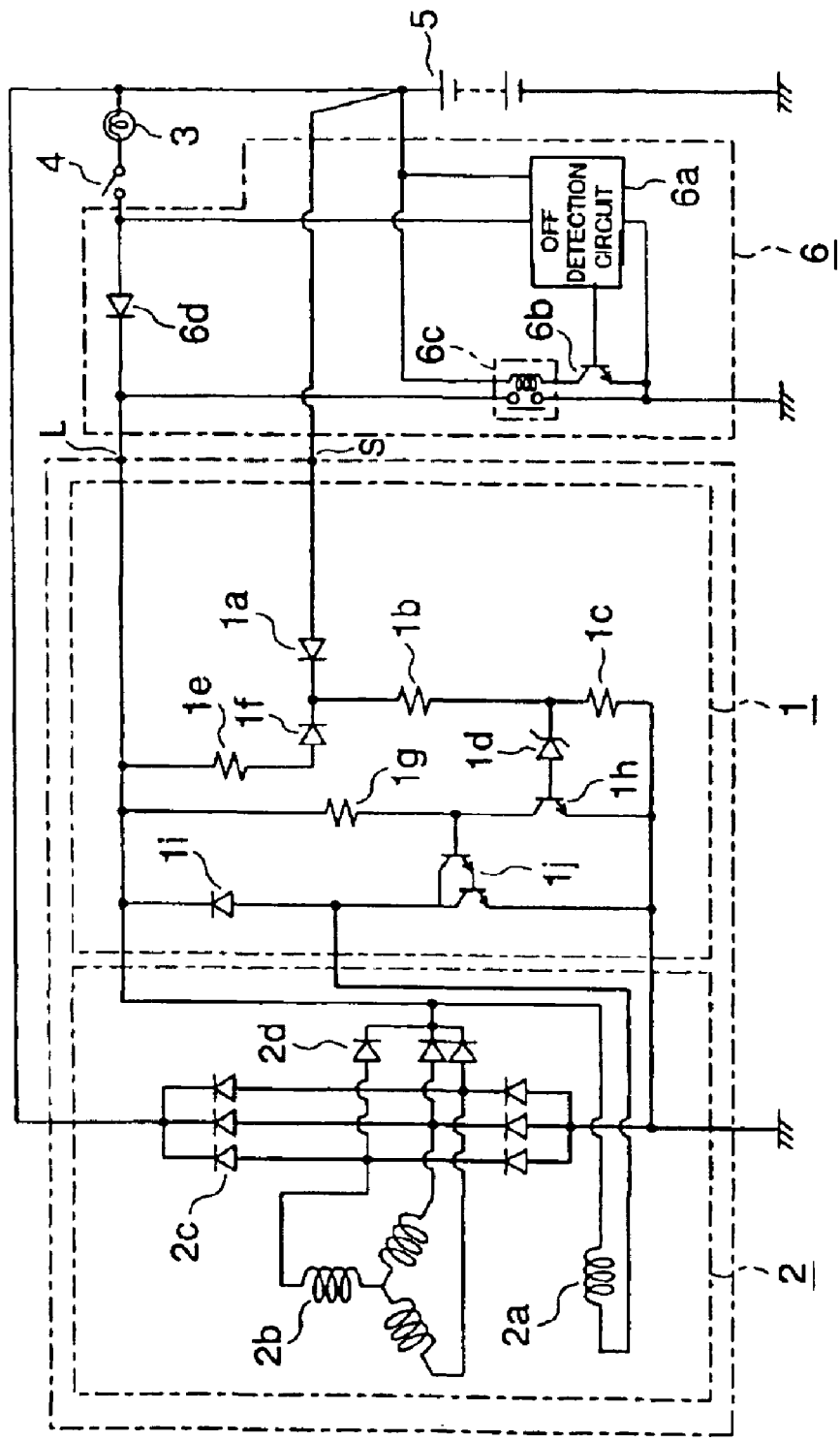
FIG. 5 is a circuit diagram illustrating the configuration of a known control unit of a vehicle generator.

FIG. 1 is a circuit diagram in which the configuration of a control unit of a vehicle generator according to a first embodiment of the present invention is illustrated. In FIG. 1, the same or corresponding parts of this embodiment as those in the known control unit illustrated in FIG. 5 are identified by the same symbols, and a description thereof is omitted. The control unit according to the first embodiment illustrated in FIG. 1 is different from the above-mentioned known one illustrated in FIG. 5 in that there is added a power generation stop terminal K connected with the control terminal of the on-off control transistor 1j. In addition, the power generation stop circuit 6 is provided with a grounding transistor 6e which is made conductive based on an off detection signal of the off detection circuit 6a to ground the power generation stop terminal K. Here, note that the power generation stop circuit 6 is not provided with the transistor 6b and the relay 6c of the known control unit.

Therefore, in the first embodiment, when the key switch 4 of a vehicle which is in operation is turned off, the off detection circuit 6a for the key switch 4 detects the turning off of the key switch 4 and makes the transistor 6e into a conductive state, so that the power generation stop terminal K of the generator is grounded to cut off the transistor 1j which serves to turn on and off a field current supplied to the field coil 2a. As a result, the generator instantaneously stops generating electricity.

The operations of this embodiment other than above are similar to those of the above-mentioned known control unit. That is, the control circuit 1 detects the voltage of the battery 5 through the voltage sensing terminal S, and when the voltage of the battery 5 rises above a predetermined value which has been set in advance, the transistor 1h is made conductive and the transistor 1j is made nonconductive, whereby the field current supplied to the field coil 2a is decreased, thus reducing the generation voltage of the generator. On the contrary, when the voltage of the battery 5 falls, the transistor 1h is made nonconductive and the transistor 1j is made conductive, whereby the field current is increased, thus raising the generation voltage of the generator.

Therefore, according to the first embodiment, it is unnecessary to interrupt a large current when the key switch 4 of the vehicle is turned off. As a result, it becomes possible to construct the system using semiconductor switches such as transistors, which are smaller in size than those of the known control unit, and hence it is possible to stop power generation of the generator in a reliable manner with the inexpensive system. In addition, the reliability in and the lifetime of the system can be improved.

Embodiment 2.

Figure 2:
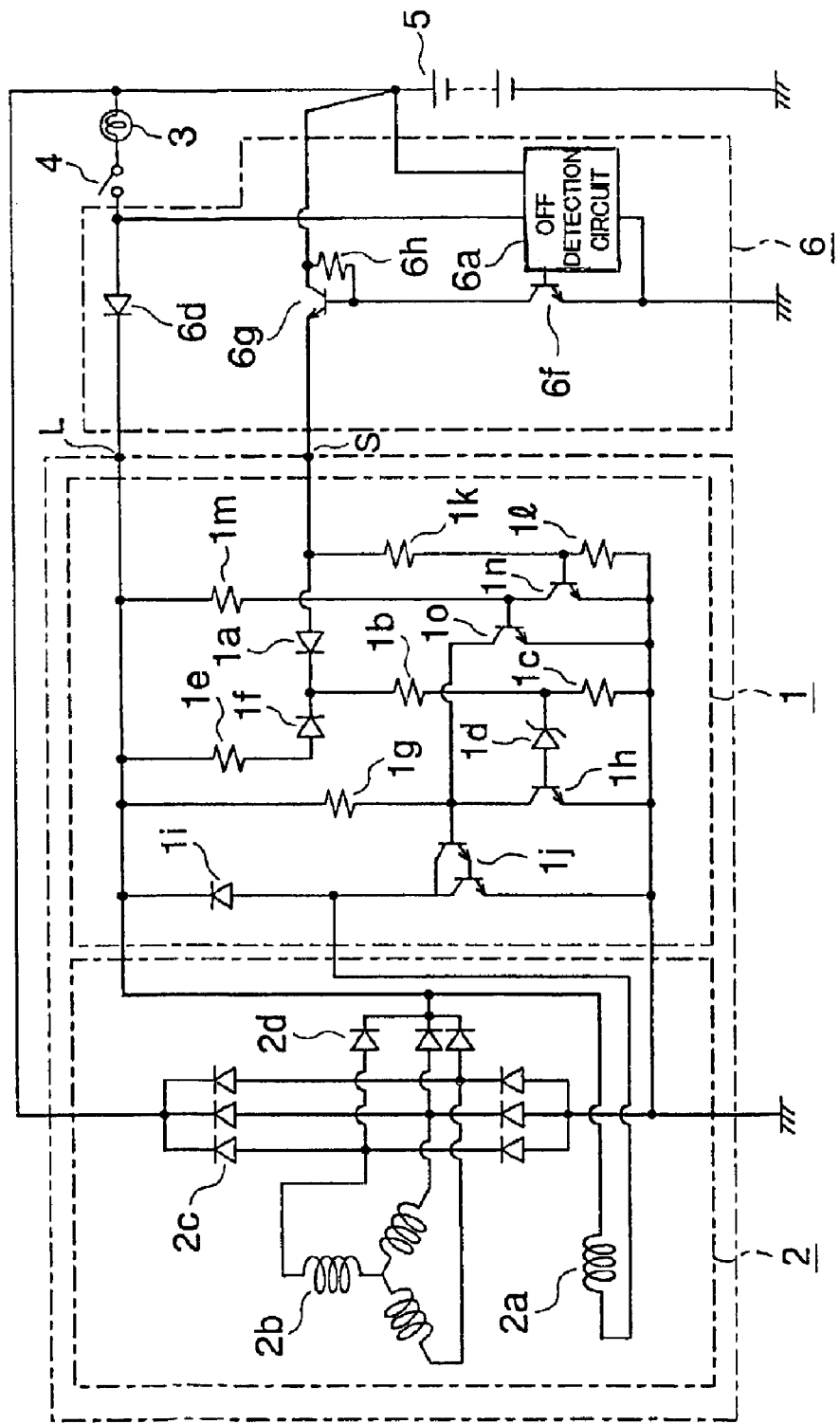
FIG. 2 is a circuit diagram illustrating the configuration of a control unit of a vehicle generator according to a second embodiment of the present invention.

FIG. 2 is a circuit diagram in which the configuration of a control unit of a vehicle generator according to a second embodiment of the present invention is illustrated. In FIG. 2, the same or corresponding parts of the second embodiment as those of the known control unit illustrated in FIG. 5 are identified by the same symbols, and a description thereof is omitted. The second embodiment illustrated in FIG. 2 is different from the known control unit illustrated in FIG. 5 in that the power generation stop circuit 6 is provided with a transistor 6f, which is made conductive based on an off detection signal of the off detection circuit 6a indicative of the turning off of the key switch 4, and a transistor 6g, which has a resistor 6h connected between its base and collector, and is made nonconductive upon conduction of the transistor 6f. However, the power generation stop circuit 6 is not provided with the transistor 6b and the relay 6c of the known control unit.

In addition, the control circuit 1 is further provided with a connection state detecting portion, which detects the connection state of the voltage sensing terminal S with the battery 5 through the conduction and nonconduction of the transistor 6g, and interrupts the control terminal of the on-off control transistor 1j upon interruption of the transistor 6g. The connection state detecting portion includes voltage dividing resistors 1k, 1l provided between the voltage sensing terminal S and ground, a combination of a resistor 1m and a transistor 1n provided between the output terminal L and ground, and a transistor 1o provided between the control terminal of the on-off control transistor 1j and ground. The transistor 1n has a control terminal connected with a connection point or node between the voltage dividing resistor 1k and the voltage dividing resistor 1l. The transistor 1o has a control terminal connected with a connection point or node between the resistor 1m and the transistor 1n.

Thus, in the second embodiment, when the key switch 4 of the vehicle which is in operation is turned off, the off detection circuit 6a for the key switch 4 detects the turning off of the key switch 4 whereby the transistor 6f is made conductive, thus rendering the transistor 6g nonconductive. As a result, the voltage of the voltage sensing terminal S of the control circuit 1 becomes zero, whereby the transistor 1n is made nonconductive and the transistor 1o is made conductive. Consequently, the transistor 1j for turning on and off the field current is made nonconductive, whereby the generator instantaneously stops generating electricity.

The operations of this embodiment other than the above are similar to those of the known control unit. That is, the control circuit 1 detects the voltage of the battery 5 through the voltage sensing terminal S, and when the voltage of the battery 5 rises above a predetermined value which has been set in advance, the transistor 1h is made conductive and the transistor 1j is made nonconductive, so that the field current supplied to the field coil 2a is decreased, thus reducing the generation voltage of the generator. On the contrary, when the voltage of the battery 5 falls, the transistor 1h is made nonconductive and the transistor 1j is made conductive, whereby the field current is increased, thus raising the generation voltage of the generator.

Therefore, according to the second embodiment, there is no need to add the power generation stop terminal K, and hence it becomes possible to construct the system with the use of semiconductor switches such as transistors, which are smaller in size than those of the known control unit. As a consequence, it is possible to stop power generation of the generator in a reliable manner with the inexpensive system. In addition, the reliability in and the lifetime of the system can be improved.

Embodiment 3.

Figure 3:
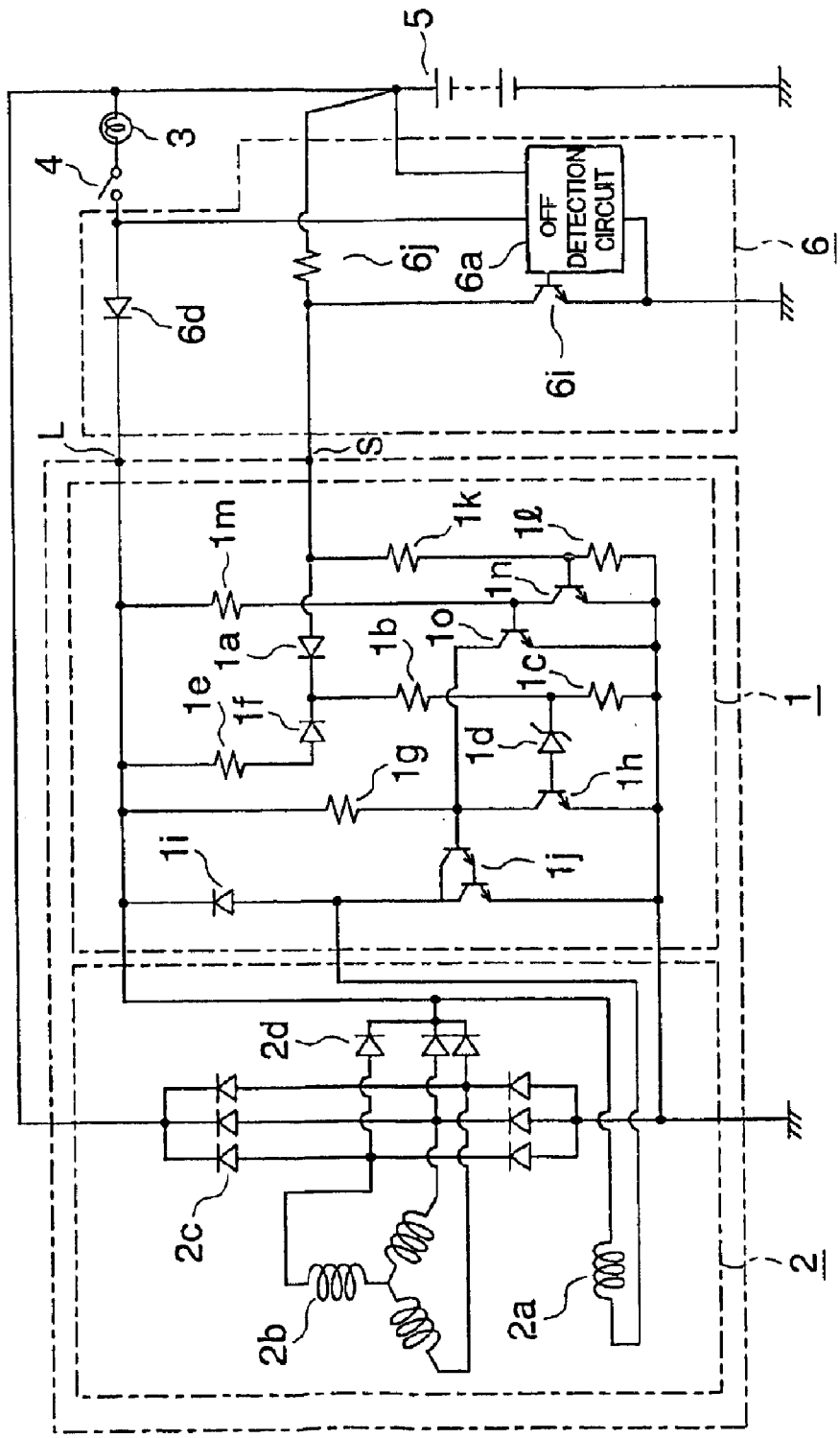
FIG. 3 is a circuit diagram illustrating the configuration of a control unit of a vehicle generator according to a third embodiment of the present invention.

FIG. 3 is a circuit diagram in which the configuration of a control unit of a vehicle generator according to a third embodiment of the present invention is illustrated. In FIG. 3, the same or corresponding parts of this third embodiment as those of the second embodiment illustrated in FIG. 2 are identified by the same symbols, and a description thereof is omitted. The third embodiment illustrated in FIG. 3 includes a control circuit 1 of the same configuration as that of the second embodiment illustrated in FIG. 2 but is different therefrom in the configuration of a power generation stop circuit 6. The power generation stop circuit 6 of this third embodiment is provided with a resistor 6j and a transistor 6i which is made conductive based on an off detection signal of the off detection circuit 6a indicative of the turning off of the key switch 4, thereby grounding the voltage sensing terminal S. However, the power generation stop circuit 6 is not provided with the transistors 6f, 6g and the resistors 6h of the second embodiment.

Therefore, in the third embodiment, when the key switch 4 of the vehicle which is in operation is turned off, the off detection circuit 6a for the key switch 4 detects the turning off of the key switch 4 and makes the transistor 6i conductive so that the voltage sensing terminal S is grounded, thus making the transistor 1n nonconductive. As a result, the transistor 1j is made conductive thereby to turn on the transistor 1o which serves to turn on and off the field current supplied to the field coil 2a, whereby the generator instantaneously stops generating electricity.

The operations of this embodiment other than the above are similar to those of the known control unit. That is, the control circuit 1 detects the voltage of the battery 5 through the voltage sensing terminal S, and when the voltage of the battery 5 rises above a predetermined value which has been set in advance, the transistor 1h is made conductive and the transistor 1j is made nonconductive so that the field current supplied to the field coil 2a is decreased, thus reducing the generation voltage of the generator. On the contrary, when the voltage of the battery 5 falls, the transistor 1h is made nonconductive and the transistor 1j is made conductive so that the field current is increased, thus raising the generation voltage of the generator.

Therefore, according to the third embodiment, there is no need to add the power generation stop terminal K, similar to the second embodiment, and it becomes possible to construct the system with the use of semiconductor switches such as transistors, which are smaller in size than those of the known control unit, and hence it is possible to stop power generation of the generator in a reliable manner with the inexpensive system. Thus, the reliability in and the lifetime of the system can be improved.

Embodiment 4.

Figure 4:
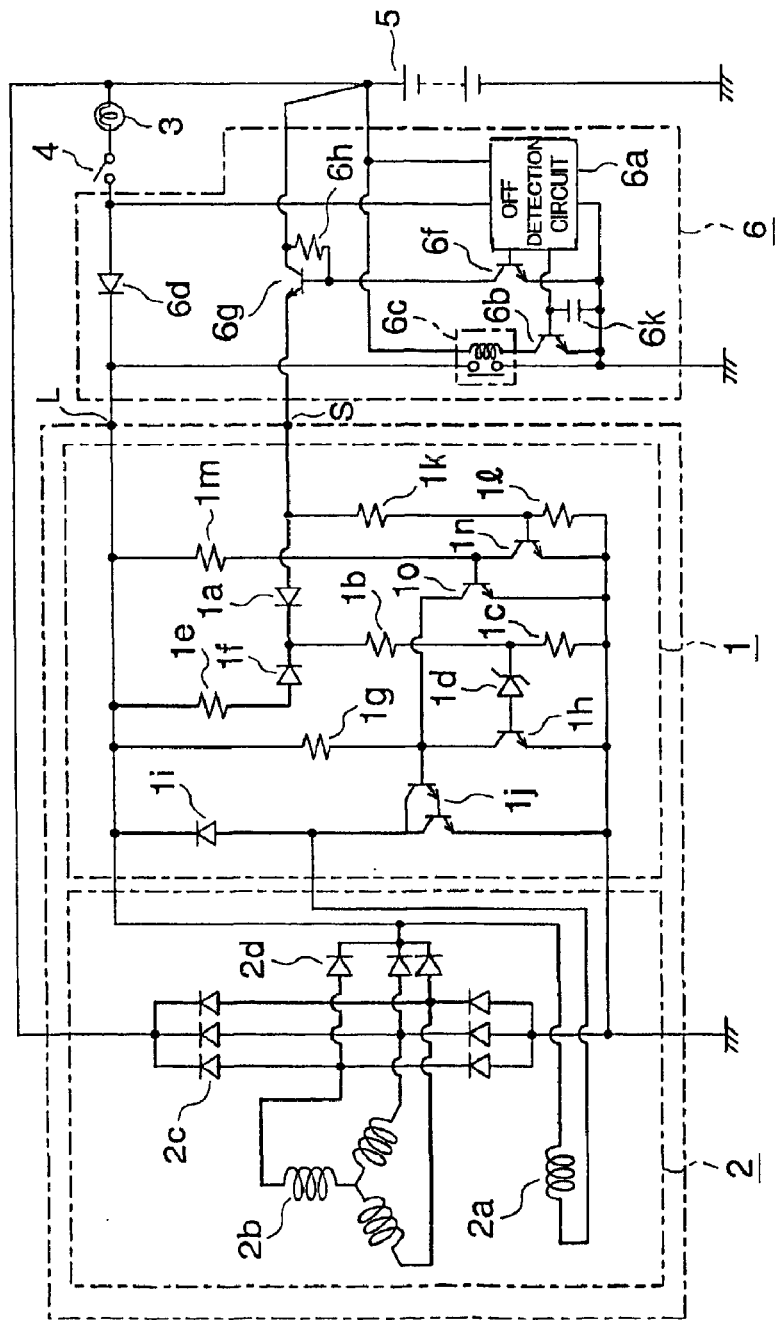
FIG. 4 is a circuit diagram illustrating the configuration of a control unit of a vehicle generator according to a fourth embodiment of the present invention.

FIG. 4 is a circuit diagram in which the configuration of a control unit of a vehicle generator according to a fourth embodiment of the present invention is illustrated. In FIG. 4, the same or corresponding parts of this fourth embodiment as those of the second embodiment and the known control unit illustrated in FIG. 2 and FIG. 5, respectively, are identified by the same symbols, and a description thereof is omitted. The fourth embodiment illustrated in FIG. 4 is a combination of the second embodiment and the above-mentioned known control unit. In addition, the power generation stop circuit 6 is provided with a capacitor connected between the base and the emitter of the transistor 6b so as to construct a grounded circuit portion which acts to ground the output terminal L supplying a field current to the field coil 2a after a predetermined period of time has elapsed from the instant when the voltage sensing terminal S is cut off from the battery 5 to interrupt the control terminal of the on-off control transistor 1j.

In this fourth embodiment, when the key switch 4 of the vehicle which is in operation is turned off, the off detection circuit 6a for the key switch 4 detects the turning off of the key switch 4, whereby the transistor 6f is made conductive, thus rendering the transistor 6g nonconductive, so that the voltage of the voltage sensing terminal S of the control circuit 1 becomes zero. As a result, the transistor 1n is turned off to make the transistor 1o conductive, so that the transistor 1j for turning on and off the field current is made nonconductive, thus stopping power generation of the generator instantaneously.

Thus, by grounding the output terminal L of the auxiliary rectifier 2d through the transistor 6b and the relay 6c after the lapse of a slight period of time by means of the capacitor 6k from the instant when the field current is interrupted by the transistor 1j to stop power generation, it is possible to instantaneously stop power generation in a reliable manner.

The operations of this embodiment other than the above are similar to those of the above-mentioned known control unit. That is, the control circuit 1 detects the voltage of the battery 5 through voltage sensing terminal S, and when the voltage of the battery 5 rises above a predetermined value which has been set in advance, the transistor 1h is made conductive and the transistor 1j is made nonconductive, whereby the field current supplied to field coil 2a is decreased, thus reducing the generation voltage of the generator. On the contrary, when the voltage of the battery 5 falls, the transistor 1h is made nonconductive and the transistor 1j is made conductive. As a result, the field current is increased to raise the generation voltage of the generator.

Thus, according to the fourth embodiment in which the present invention is combined with the above-mentioned known control unit, the output terminal L is grounded through the relay 6c immediately after power generation is stopped by interruption of the voltage sensing terminal S. As a result, it becomes possible to miniaturize the relay 6c, and hence it is also possible to stop power generation of the generator with an inexpensive system more reliably and safely than with the known control unit, thus improving the reliability in and the lifetime of the system.

As described in the foregoing, according to the present invention, since the power generation stop terminal, the voltage sensing terminal or the output terminal is controlled to stop power generation of the generator instantaneously, there is no need to interrupt a large current when the vehicle key switch is turned off. As a result, it is possible to instantaneously stop power generation with an inexpensive system configuration in a safe manner.

While the invention has been described in terms of preferred embodiments, those skilled in the art will recognize that the invention can be practiced with modifications within the spirit and scope of the appended claims.

What is claimed is:

1. A control unit of the vehicle generator comprising: a vehicle generator;

a battery adapted to be charged by an output of said vehicle generator;

a control circuit having an on-off control switching section for controlling the turning on and off of a field current of said vehicle generator, said control circuit being operable to interrupt said on-off control switching section when a detected voltage of said battery is higher than a reference voltage, and make said on-off control switching section conductive thereby to control the voltage of power generation at a predetermined voltage when the detected voltage of said battery is below said reference voltage;

a power generation stop circuit having an off detection circuit for detecting turning off of a key switch of a vehicle, said power generation stop circuit being operable to stop the power generation of said vehicle generator when said off detection circuit detects the turning off of said vehicle key switch; and a power generation stop terminal for interrupting said on-off control switching section; wherein said power generation stop circuit controls said power generation stop terminal to stop the power generation of said vehicle generator instantaneously when said off detection circuit detects the turning off of said vehicle key switch.

2. The control unit of a vehicle generator according to claim 1, wherein said power generation stop circuit comprises a grounding switching section which is operated based on an off detection signal from said off detection circuit to ground said power generation stop terminal.

3. The control unit of a vehicle generator according to claim 1, wherein said on-off control switching section includes a switch for switching the field current of said vehicle generator to one of an on state and an off state.

4. The control unit of a vehicle generator according to claim 3, wherein said switch is a Darlington transistor.

5. The control unit of a vehicle generator according to claim 4, wherein said power generation stop terminal is directly connected to a control terminal of the Darlington transistor.

6. The control unit of a vehicle generator according to claim 3, wherein said power generation stop terminal is directly connected to said switch.

* * * * *